United States Patent [19]

Lederman

[11] Patent Number: 5,062,512

[45] Date of Patent: Nov. 5, 1991

[54] ROLLER CLUTCH CAGE WITH PUSH ON INSTALLATION

[75] Inventor: Frederick E. Lederman, Sandusky, Ohio

[73] Assignee: General Motors Corporation, Detroit, Mich.

[21] Appl. No.: 558,007

[22] Filed: Jul. 25, 1990

[51] Int. Cl.⁵ .......................................... F16D 41/00
[52] U.S. Cl. .................................................. 192/45
[58] Field of Search .................. 192/45; 403/280, 282; 384/510

[56] References Cited

U.S. PATENT DOCUMENTS

| | | | |
|---|---|---|---|
| 4,712,661 | 12/1987 | Lederman et al. | 192/45 |
| 4,723,851 | 2/1988 | Troster et al. | 384/504 X |
| 4,783,182 | 11/1988 | Caron et al. | 384/510 X |
| 4,819,776 | 4/1989 | Leitz et al. | 192/45 |
| 4,821,857 | 4/1989 | Groh | 192/45 |
| 4,830,157 | 5/1989 | Lederman | 192/45 |
| 4,850,463 | 7/1989 | Lederman | 192/45 |

Primary Examiner—Allan D. Herrmann
Assistant Examiner—Nicholas Whitelaw
Attorney, Agent, or Firm—Patrick M. Griffin

[57] ABSTRACT

A roller clutch cage includes a provision for centralizing circumferential stress in the cage, thereby allowing the cage to shrink or expand without bellmouthing. Ribs on the cage hit the cam race as the cage is installed, circumferentially stressing the cage, and allowing it to shrink or expand enough to be pushed onto the cam race far enough that the ribs can snap into a groove. Since the roller pockets stay parallel to the axis, the pathway race need not be present to prevent roller dislodging, and the pathway race can be added as a last step.

3 Claims, 4 Drawing Sheets

ROLLER CLUTCH CAGE WITH PUSH ON INSTALLATION

This invention relates to roller clutches in general, and specifically to a roller clutch that is especially adapted to be installed to one of a pair of clutch races.

BACKGROUND OF THE INVENTION

Roller clutch assemblies have three basic components, a roller clutch and a pair of roller clutch races between which the roller clutch is located. Each race has a generally cylindrical inner surface which, when the races are maintained coaxial to one another, define a generally annular space between the races. The inner surface of one race, the pathway race, is completely smooth and cylindrical, while the other, the cam race, has a V notched, saw tooth configuration.

The roller clutch has a cage that retains a plurality of rollers and springs as a secure subassembly for easy handling and installation. The clutch cage is sized so as to fit between the clutch races, and is generally described as being installed in the annular space between the races. However, those skilled in the art understand that situations where the roller clutch could actually be installed directly into an already formed annular space would be rare. For one thing, it is usually only the presence of roller clutch between the races that creates the annular space in the first instance. More importantly, it is usually desirable to install the clutch to the cam race first, and then install the pathway race last by the so called ringing in method, with its simultaneous axial push and angular twist. This is so because each roller is typically retained to the cage before installation by its own individual energizing spring, which keeps the roller resiliently loaded forward against a roller rest surface on the cage. In order for the roller to operate properly after clutch installation, it has to be shifted back away from its cage rest surface, so that it can travel back and forth without hitting the rest surface. The twisting motion of the pathway race is what shifts the rollers safely away from their cage rest surfaces.

Spring dependent roller retention depends on the roller pocket staying square or parallel to the cage axis. If the pocket is tipped off axis during installation, the roller may fall out. In order to be able to install the clutch to the cam race alone without losing the rollers, it is important that the orientation of the pockets not be disturbed to too great a degree. One known means of fixing the cage to the cam race alone is called the twist lock method. The clutch cage is provided with retention ears which fit through the notches created by the cam ramps, thereby allowing the cage to be pushed axially straight onto the cam race without binding. Then, the cage is twisted through a small angle, which shifts the retention ears into abutment with the end faces of the cam race, preventing the cage from shifting axially relative to the cam race. None of the twist and lock cage installation motions disturb the orientation of the roller pockets relative to the cage axis, so roller retention is not jeopardized. While the twist lock method provides adequate retention of the cage to the cam race, it does require that the retention ears be exposed on the face of the cam race, which might be undesirable in some applications. An example of a twist lock cage may be seen in Lederman U.S. Pat. No. 4,712,661, assigned to the assignee of the subject invention.

One patent, Groh U.S. Pat. No. 4,821,857, does disclose a means of fixing the clutch cage to the cam race without using exposed retention ears. However, the installation scheme apparently relies on inserting the clutch directly into an annular space between a pair of races that are already maintained in coaxial relation. In Groh, a folded metal roller cage 11 consists of two axially spaced side disks, 13 and 18, joined together by cross bars 15 and 22. Cylindrical rollers 36 are retained parallel to the axis of cage 11 in pockets formed between the side disks 13 and 18, by some means not described in detail. One side disk, 13, is designed to fit between the races 27 and 29 without interference. Side disk 18, however, has a diameter designed to force it into the cam race 29 as cage 11 is inserted, thereby flexing it radially inwardly. Disk 18 eventually snaps back out into a groove 33 cut into cam race 29. If cage 11 were installed just to cam race 29, the flexing in of the one side disk 18 would cause cage 11 to go conical, often called bellmouthing, which would tilt the roller pockets off axis. This would jeopardize the retention of the rollers 36 if the pathway race 27 were not already in position. But, as noted, instances where the clutch races are already in coaxial relation are rare. Another drawback of the Groh installation scheme is that the groove 33, as well as the ultimate location of the flexible side disk 18, are well of inboard the end faces of the races. It would be difficult to apply any twisting motion to the cage 11 as it was pushed in, at least once the side disk 18 had moved beyond the end faces of the races. It would, therefore, also be difficult to shift the rollers 36 back away from their forward loaded shipping position. In fact, FIG. 2 of Groh appears to show the rollers right against the cage cross bars.

SUMMARY OF THE INVENTION

The invention provides a roller clutch with a cage that can be snap fitted into a grooved cam race first, but without disturbing the orientation of the roller pockets.

The roller clutch of the invention operates between a pathway race and a cam race that has a circular groove cut into its inner surface. The unitary plastic cage has a series of box shaped roller pockets arrayed about, and parallel to, a central axis of the cage. One portion of each roller pocket, specifically a thinned cross bar, is designed so as to be circumferentially flexible toward, or away from, the adjacent pockets. An energizing spring keeps a roller loaded against the thinned cross bar of each pocket for shipping retention. Each pocket is connected to the flexible cross bar of an adjacent pocket by a connecting member in the form of a short bar, thereby establishing a free state circumference of the cage. The free state circumference of the cage is designed to clear the cam race surface. The connector bars are also rigid in the circumferential direction, and are located in the central plane of the cage. Therefore, if the cage is put into circumferential stress, either compression or tension, the connector bars are either forced into, or pull out on, the thinner pocket cross bars. This flexes the cross bars in or out, allowing the effective circumference of the cage to shrink or expand from the free state circumference. The cross bar flexing is concentrated in the central plane of the cage, so that the cage does not bellmouth, and the roller pockets remain basically parallel to the cage axis.

The cage also has a plurality of ribs molded to the outside of the pockets in an evenly distributed, diametrically opposed arrangement. The ribs are sized to fit into the cam race groove, and are located at a diameter designed to interfere with the inner surface of the cam race when the cage is moved coaxially toward it. Therefore, the rib contact puts the cage in compression or tension, compression in the particular embodiment disclosed. The cage compression forces the connecting bars into the centers of the roller pocket cross bars, buckling them inwardly. The circumference of the cage contracts enough to allow the ribs to clear the cam race, but the pockets stay parallel to the cage axis. When the cage is pushed in far enough that the ribs reach the groove, the cage expands back out to approximately its free state circumference, and the cage is retained securely. The pathway race can then be rung in as a last step to complete the clutch assembly.

It is, therefore, a general object of the invention to provide a roller clutch that can be initially snap fitted into a grooved cam race alone, without bellmouthing, so that roller retention is not jeopardized.

It is another object of the invention to provide such a cage that includes an annular array of roller pockets joined to one another at circumferentially flexible portions located in a central plane of the cage, so that circumferential stress in the cage can be translated into a changing cage circumference, while the roller pockets stay basically parallel to the cage axis.

It is another object of the invention to provide such a cage with evenly distributed, diametrically opposed ribs designed to contact the cam race as the cage is pushed axially over it, putting the cage into compression or tension so as to contract or expand the cage.

DESCRIPTION OF THE PREFERRED EMBODIMENT

These and other objects and features of the invention will appear from the following written description, and from the drawings, in which.

Figure 1:
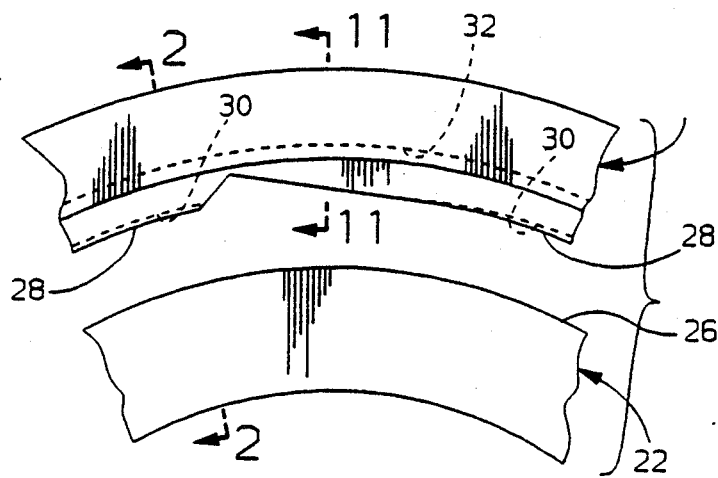
FIG. 1 is an axial view of a portion of an inner pathway race and an outer cam race in coaxial relation.
Figure 2:
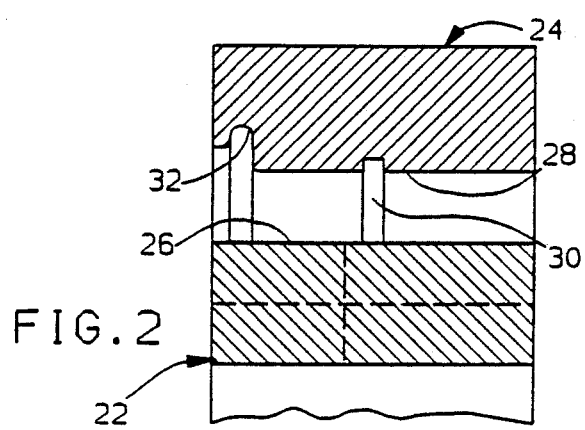
FIG. 2 is a sectional view of the races taken along the line 2—2 of FIG. 1.

Referring first to FIGS. 1 through 4, a roller clutch made according to the invention, indicated generally at 20, operates between an inner pathway race, indicated generally at 22 and an outer cam race, indicated generally at 24. The inner surface of pathway race 22 comprises a smooth and uninterrupted cylindrical pathway 26. The inner surface of cam race 24 is not interrupted, but is still generally cylindrical, including as it does a plurality of arcuate bearing surfaces 28, each of which lies on the same diameter and may be considered to be a single cylindrical surface. The inner surface of cam race 24 is also interrupted by a circular central groove 30, and a circular side notch 32, each of which is coaxial to cam race 24. Groove 30 does not cover 360 degrees, as it runs only through the axial center of each bearing surface 28, but may still be considered a single groove. Side notch 32, however, is deep enough to cover 360 degrees. When the races 22 and 24 are maintained in coaxial relation, the pathway 26 and bearing surfaces 28 are concentric to one another, creating an annular space therebetween. Clutch 20 is, generally speaking, adapted to be installed between the coaxial races 22 and 24, although they are not actually maintained in coaxial relation until clutch 20 has been installed.

Referring next to FIGS. 3 through 7, the basic structural framework of clutch 20 is an integrally molded plastic cage made up of a plurality of evenly spaced, box shaped pockets, each of which is indicated generally at 34. Pockets 34 are interconnected by an equal plurality of connector bars 36 in a circular array about a central axis, not visible in the scale of the drawings shown. Each pocket 34 is also symmetrical to a central plane that is perpendicular to the central axis, as indicated by the vertical dotted line in FIG. 7. Each pocket 34 is rectangular, as viewed radially inwardly, and arcuate as viewed axially, with a partially cylindrical outer surface 38 that conforms to a respective cam race bearing surface 28. Each pocket 34 is stiff enough, in the radial direction, to keep a respective cam race bearing surface 28 and the pathway 26 apart, thereby maintaining the races 22 and 24 coaxial. One portion of each pocket, a cross bar 40, is deliberately made thinner than the rest of pocket 34, and oriented with its length axially directed. Each connector bar 36 extends from the center of a respective cross bar 40 to an adjacent pocket 34, and is oriented with its length in the central plane. In a free, undeformed state, each pocket 34, and each pocket cross bar 40, is parallel to the central axis. Each pocket 34 also contains a cylindrical roller 42 and associated energizing spring 44. Each spring 44 loads its roller 42 forward against a cross bar 40 before the installation of clutch 20. This is the conventional manner of retaining a roller, and has the virtue of simplicity, although the stability of the rollers 42 is highly dependent upon the pockets 34 remaining aligned with the central axis.

Figure 4:
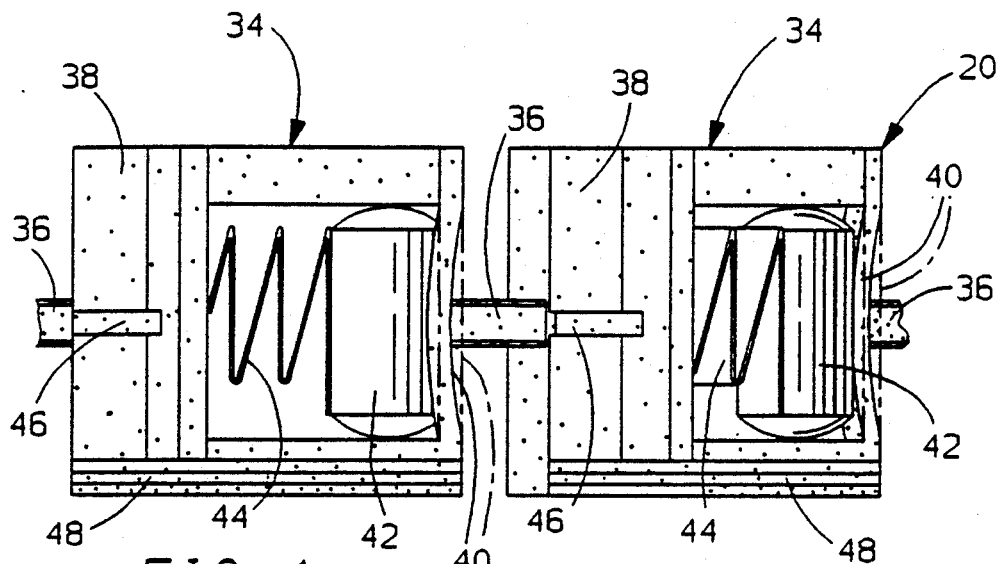
FIG. 4 is a radialy inwardly directed view of a pair of roller pockets with rollers and springs included, showing a free state condition of the pockets in dotted lines, and a compressed condition in solid lines.
Figure 5:
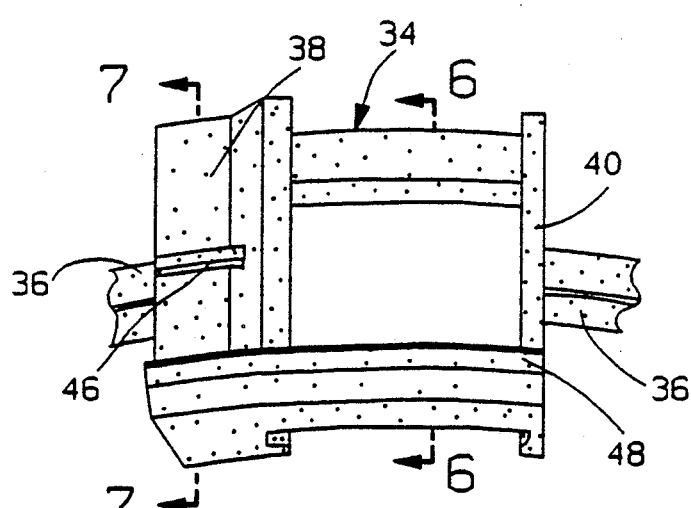
FIG. 5 is a perspective view of a pocket alone.
Figure 6:
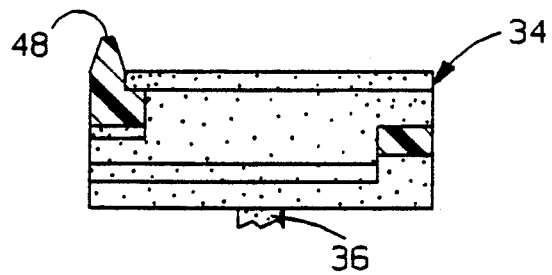
FIG. 6 is sectional view of a pocket taken along the line 6—6 of FIG. 5.
Figure 7:
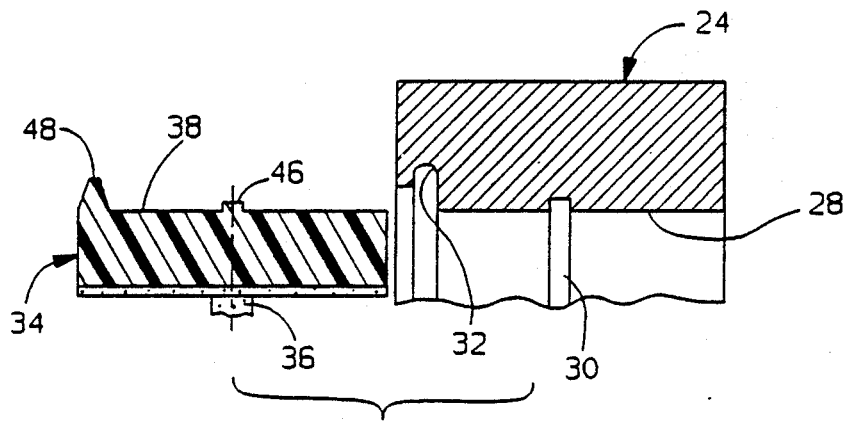
FIG. 7 is a sectional view of a pocket taken along the line 7—7 of FIG. 5, shown coaxial to the cam race.

Referring still to FIGS. 4 through 7, additional structure on each pocket 34 allows clutch 20 to be installed in snap in fashion without disturbing the alignment of the pockets 34. Molded to the center of each pocket surface 38 is an upstanding rib 46, which is sized to fit within cam race groove 30. In the embodiment disclosed, each pocket 34 is also molded with an upstanding side flange 48, which is sized to fit with the cam race side notch 32. The circumference upon which the pocket outer surfaces 38 all lie at any point in time may be considered to be the circumference of the cage. The free state or pre-installation circumference, as shown by the horizontal line in FIG. 7, is designed to clear the cam race bearing surfaces 28, but the upstanding ribs 46 do not. Since the ribs 46 are evenly spaced, and since each is generally diametrically opposed to another, an even, radially inwardly force applied to them would put the whole cage, including all of the pockets 34, into compression. That compression would, in turn, be translated by the stiff connector bars 36 into a symmetrical flexing of the cross bars 40 inwardly to a slight curvature, as shown in FIG. 4, reducing the circumference. The curvature would be too slight to jeopardize the retention of the roller 42 loaded against it. Furthermore, with the flexing of all the cross bars 40 being concentrated in the central plane, each pocket 34 would remain effectively parallel to the central axis, without bellmouthing or tipping.

Figure 8:
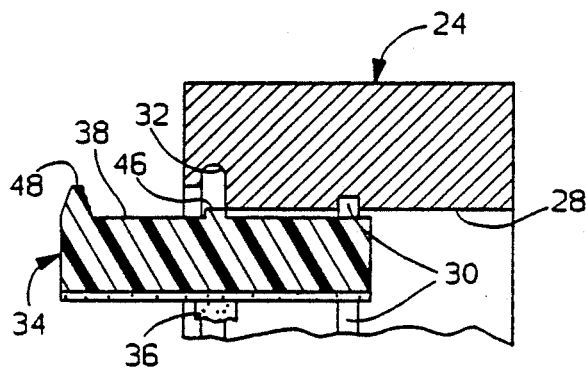
FIG. 8 is a view like 7, but showing the ribs on the cage pocket beginning to make contact with the surface of the cam race.
Figure 9:
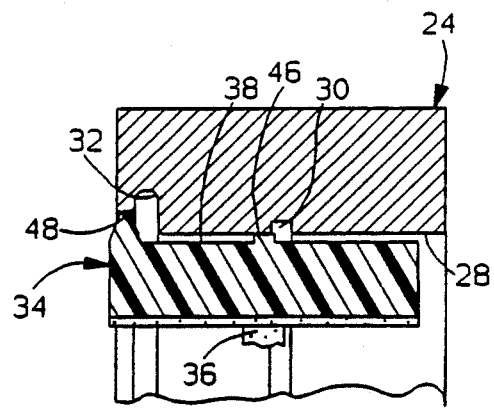
FIG. 9 is a view like 8, but showing the ribs having moved axially along the cam race surface after the cage has contracted in circumference.
Figure 10:
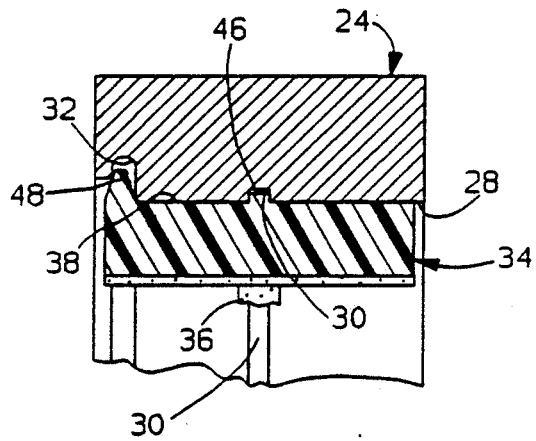
FIG. 10 shows the pocket after the rib has reached the cam race groove and the cage has re-expanded.
Figure 11:
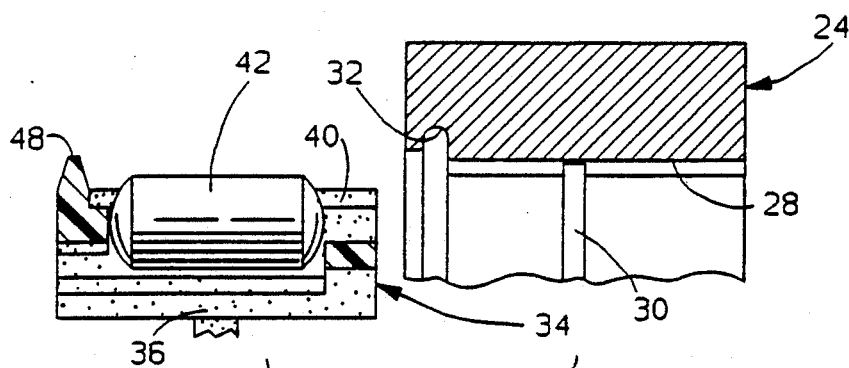
FIG. 11 shows a view equivalent to FIG. 7, but showing the cage pocket sectioned as in FIG. 6.
Figure 12:
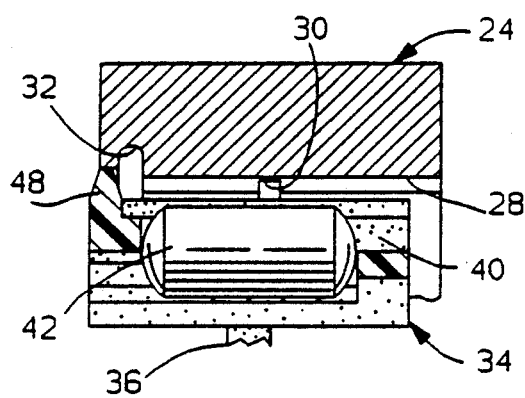
FIG. 12 is a view equivalent to FIG. 9, also showing the cage pocket sectioned as in FIG. 6.

Referring next to FIGS. 8 through 14, the installation of clutch 20 is illustrated. Clutch 20 is initially indexed until the pocket outer surfaces 38 are registered with the cam race bearing surfaces 28, and then pushed coaxially toward cam race 24. The ribs 46 simultaneously engage the edges of the bearing surfaces 28, which may be chamfered slightly, as shown in FIG. 8. Continued pressing creates a radially inward force, compressing each pocket 34 as described above. Each pocket cross bar 40 bows in, and the circumference contracts enough to allow the ribs 46 to pass under the bearing surfaces 28, FIG. 9. At the same time, the side flanges 48 move radially inwardly far enough to begin to clear the side notch 32. Eventually, as seen in FIG. 10, the ribs 46 axially align with the groove 30, and the compression is relieved, allowing the cross bars 40 to flex back and the circumference to again expand. The side flanges 48 move out into the side notch 32 as the ribs 46 move out into the groove 30. Axial retention of clutch 20 to cam race 24 is very strong, provided both by the ribs 46 and the side flanges 48. As best seen by comparing FIGS. 11 and 12, the centralized, even contraction and expansion of clutch 20, by preventing the pockets 34 from tipping off axis, also allows the rollers 42 to stay parallel and securely retained.

Figure 3:
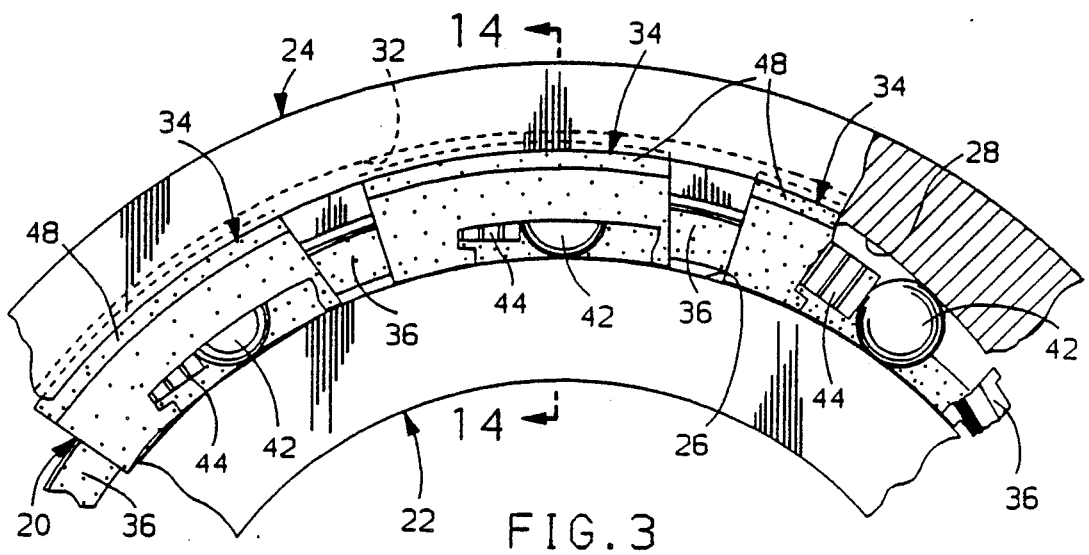
FIG. 3 is an axial view of a portion of the entire clutch assembly.
Figure 13:
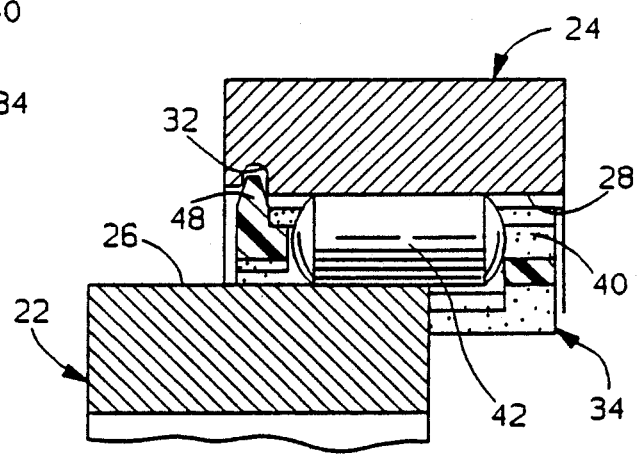
FIG. 13 is a view like 12, but showing the cage fully installed to the cam race, and showing the pathway race approximately halfway installed.
Figure 14:
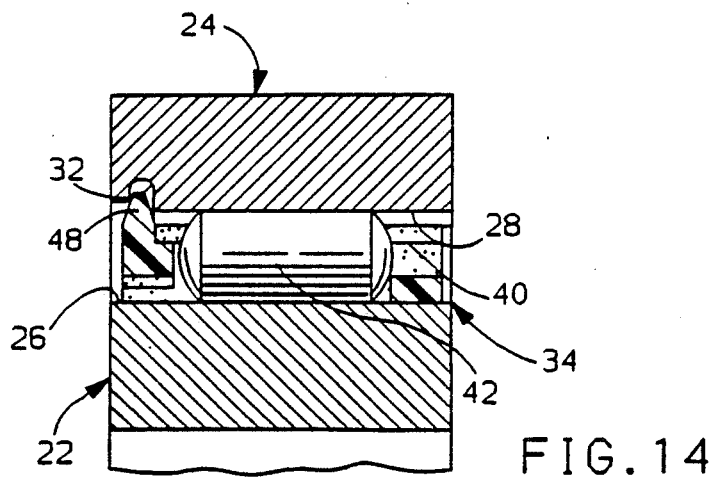
FIG. 14 is a sectional view of the complete assembly taken along the line 14—14 of FIG. 1.

Referring last to FIGS. 3, 13 and 14, the final assembly of pathway race 22 is illustrated. Since pathway race 22 does not have to be present to prevent the loss of rollers 42 when clutch 20 is initially installed, it can be added last. Pathway race 22 is assembled by the conventional ringing in method, in which it is inserted axially between the rollers 42 and simultaneously twisted counterclockwise, from the perspective of FIG. 3, approximately a quarter turn. This serves to shift each roller 42 to the left, away from the cross bar 40 against which it rested, compressing each spring 44. The clutch assembly of clutch 20 and the races 22 and 24 is then complete.

Variations of the embodiment disclosed could be made. The ribs 46 act more efficiently if they are located approximately in the center of each pocket 34, as disclosed, since they apply the compression forces centrally in the first instance. More fundamentally, however, it is the deliberate thinning of the axially extending pocket cross bars 40, and the specific orientation of the rigid connector bars 36, which cooperate to concentrate the effect of the compressive force caused by the ribs 46 into the central plane, and thereby keep the pockets 34 parallel. Therefore, ribs like 46 could be located more to the side. Nevertheless, centralizing the ribs 46 leaves room for the side flanges 48, so as to provide even more axial retention to cam race 24. Ribs like 46 also could be located elsewhere on the cage, such as on the connector bars 36. Therefore, it will be understood that the invention is not intended to be limited just to the particular embodiment disclosed.

The embodiments of the invention in which an exclusive property or privilege is claimed are defined as follows:

1. A roller clutch cage adapted to be installed between a pair of coaxially disposable clutch races, one of said races having a generally cylindrical surface with a circular groove, said cage comprising, a plurality of adjacent roller pockets arrayed in an annular pattern about and parallel to a central axis, each pocket having a boundary defining member that is flexible, in the circumferential direction, toward and away from each adjacent pocket, a plurality of connecting members interconnecting said adjacent pockets at said flexible boundary defining members, thereby determining a free state circumference of said cage that is designed to clear said one race surface when said cage is moved coaxially toward said one race, said connecting members further being substantially rigid and disposed generally in a central plane perpendicular to said central axis so that, when said cage is put into compression or tension, said connecting members translate said compression or tension into circumferential flexing of said boundary defining member in said central plane, thereby allowing the circumference of said cage to effectively shrink or expand from its free state circumference while said pockets remain substantially parallel to said cage axis, and, a plurality of ribs located at evenly spaced, diametrically opposed locations and at a diameter designed to fit within said race groove, but to interfere with said one race surface when said cage is at its free state circumference, thereby applying an evenly distributed radial force to said cage to put said cage into compression or tension, whereby, said cage may be installed to said one race by moving it, at its free state circumference, coaxially toward said one race, thereby forcing said ribs into said one race surface to put said cage into compression or tension and shrinking or expanding said cage circumference as said cage pockets remain substantially parallel to said cage axis until said ribs move into alignment with said groove, whereupon said cage may return to its free state circumference as said ribs move into said groove.

2. A roller clutch adapted to be installed between a pair of coaxially disposable clutch races, one of said races having a generally cylindrical surface with a circular groove, said clutch comprising, a cage including a plurality of adjacent, box shaped roller pockets arrayed in an annular pattern about and parallel to a central axis, each pocket further having a circumferentially flexible cross bar oriented substantially parallel to said central axis, a plurality of cylindrical rollers, each of which is resiliently loaded against a respective cage pocket cross bar, a plurality of connecting members interconnecting said adjacent pockets at said flexible cross bars, thereby determining a free state circumference of said cage that is designed to clear said one race surface when said cage is moved coaxially toward said one race, said connecting members further being substantially rigid and disposed generally in a central plane perpendicular to said central axis so that, when said cage is put into compression or tension, said connecting members translate said compression or tension into circumferential flexing of said pocket cross bars in said central plane, thereby allowing the circumference of said cage to effectively shrink or expand from its free state circumference while said pocket cross bars remain substantially parallel to said cage axis, and, a plurality of ribs located at evenly spaced, diametrically opposed locations and at a diameter designed to fit within said race groove, but to interfere with said one race surface when said cage is at its free state circumference, thereby applying an evenly distributed radial force to said cage to put said cage into compression or tension, whereby, said cage may be installed to said one race by moving it, at its free state circumference, coaxially toward said one race, thereby forcing said ribs into said one race surface to put said cage into compression or tension and shrinking or expanding said cage circumference as said cage pocket cross bars and rollers remain substantially parallel to said cage axis until said ribs move into alignment with said groove, whereupon said cage may return to its free state circumference as said ribs move into said groove.

3. A roller clutch assembly, comprising, a pair of coaxially disposable clutch races, one of said races having a generally cylindrical surface with a circular groove, and, a roller clutch having a generally annular cage with a central plane perpendicular to a central axis of said cage, said cage further having a plurality of adjacent roller pockets arrayed about said central axis and parallel thereto, each pocket further having, a portion that is flexible, in the circumferential direction, toward and away from each adjacent pocket, said cage further including a plurality of connecting members interconnecting said adjacent pockets at said flexible boundary defining members, thereby determining a free state circumference of said cage that is designed to clear said one race surface when said cage is moved coaxially toward said one race, said connecting members further being substantially rigid and disposed generally in said cage central plane so that, when said cage is put into compression or tension, said connecting members translate said compression or tension into circumferential flexing of said boundary defining member in said central plane, thereby allowing the circumference of said cage to effectively shrink or expand from its free state circumference while said pockets remain substantially parallel to said cage axis, a plurality of ribs located on said cage at evenly spaced, diametrically opposed locations and at a diameter designed to fit within said race groove, but to interfere with said one race surface when said cage is at its free state circumference, thereby applying an evenly distributed radial force to said cage to put said cage into compression or tension, whereby, said cage may be installed to said one race by moving it, at its free state circumference, coaxially toward said one race, thereby forcing said ribs into said one race surface to put said cage into compression or tension and shrinking or expanding said cage circumference as said cage pockets remain substantially parallel to said cage axis until said ribs move into alignment with said groove, whereupon said cage may return to its free state circumference as said ribs move into said groove.

* * * * *